(12) United States Patent
Zant et al.

(10) Patent No.: US 10,926,928 B2
(45) Date of Patent: Feb. 23, 2021

(54) HIGH STRENGTH CABLE TIE

(71) Applicant: ABB Schweiz AG, Baden (CH)

(72) Inventors: Nikolaus Zant, Raleigh, NC (US); Harald Martini, Vasteras (SE); Kathryn F. Murphy, Raleigh, NC (US); Mark Drane, Collierville, TN (US); Dariusz Bednarowski, Cracow (PL); Marco Schneider, Wurenlingen (CH); Yan Gao, Memphis, TN (US); Jens Rocks, Freienbach (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/566,959

(22) PCT Filed: Apr. 14, 2016

(86) PCT No.: PCT/US2016/027509
§ 371 (c)(1),
(2) Date: Oct. 16, 2017

(87) PCT Pub. No.: WO2018/190782
PCT Pub. Date: Oct. 18, 2018

(65) Prior Publication Data
US 2018/0282037 A1 Oct. 4, 2018

Related U.S. Application Data

(60) Provisional application No. 62/149,213, filed on Apr. 17, 2015.

(51) Int. Cl.
*B65D 63/10* (2006.01)
*F16B 2/16* (2006.01)
(Continued)

(52) U.S. Cl.
CPC ...... *B65D 63/1072* (2013.01); *B29C 45/0005* (2013.01); *B29C 48/06* (2019.02);
(Continued)

(58) Field of Classification Search
CPC ............... B65D 63/10; B65D 63/1018; B65D 63/1027; B65D 63/1036; B65D 63/1045;
(Continued)

(56) References Cited

U.S. PATENT DOCUMENTS 2,192,946 A * 3/1940 Towner ................. F42B 39/005
102/528
3,475,264 A * 10/1969 Chase .................... B29C 70/00
428/74

(Continued)

*Primary Examiner* — Jack W Lavinder
(74) *Attorney, Agent, or Firm* — Taft Stettinius & Hollister LLP

(57) ABSTRACT

A reinforced cable tie generally includes an elongate strap, a head attached to a first end of the strap and a continuous fiber reinforcement disposed in and extending substantially continuously along a path defining at least one of the strap and the head. The head has one or more apertures formed therein and a locking device disposed in the aperture of the head. The locking device is configured to permit a second end of the strap opposite the head to be inserted through the head aperture in a first direction and is further configured to prevent movement of the second end of the strap from the head aperture in a second direction opposite the first direction.

10 Claims, 6 Drawing Sheets

(51) Int. Cl.
*F16B 2/08* (2006.01)
*B29C 45/00* (2006.01)
*B32B 27/12* (2006.01)
*B32B 37/18* (2006.01)
*B32B 38/00* (2006.01)
*B29C 70/52* (2006.01)
*B29C 48/06* (2019.01)
*B29L 31/00* (2006.01)
*B29K 105/08* (2006.01)
*B29K 101/12* (2006.01)
*B29C 45/14* (2006.01)

(52) U.S. Cl.
CPC ............. *B29C 70/52* (2013.01); *B32B 27/12* (2013.01); *B32B 37/182* (2013.01); *B32B 38/0004* (2013.01); *B65D 63/1027* (2013.01); *B65D 63/1045* (2013.01); *F16B 2/08* (2013.01); *F16B 2/16* (2013.01); *B29C 45/14786* (2013.01); *B29K 2101/12* (2013.01); *B29K 2105/08* (2013.01); *B29L 2031/7276* (2013.01); *B65D 2563/101* (2013.01)

(58) Field of Classification Search
CPC ............ B65D 63/1054; B65D 63/1063; B65D 63/1072; B65D 63/1081
See application file for complete search history.

(56) References Cited

U.S. PATENT DOCUMENTS

| | | | |
|---|---|---|---|
| 4,599,126 A | 7/1986 | Duffield | |
| 5,595,696 A | 1/1997 | Schlarb et al. | |
| 5,976,627 A | 11/1999 | Wynne | |
| 6,128,809 A * | 10/2000 | Khokhar | F16L 3/2338 24/136 R |
| 6,863,855 B2 | 3/2005 | Shilale | |
| 2003/0057590 A1 | 3/2003 | Loher et al. | |
| 2004/0098841 A1* | 5/2004 | Crosby | B65D 63/10 24/16 R |
| 2012/0180270 A1 | 7/2012 | Marmelstein | |
| 2013/0298353 A1 | 11/2013 | Drane et al. | |
| 2014/0020229 A1 | 1/2014 | Moore | |
| 2014/0059809 A1* | 3/2014 | Gao | B65D 63/10 24/16 PB |
| 2015/0064437 A1 | 3/2015 | Luo et al. | |

* cited by examiner

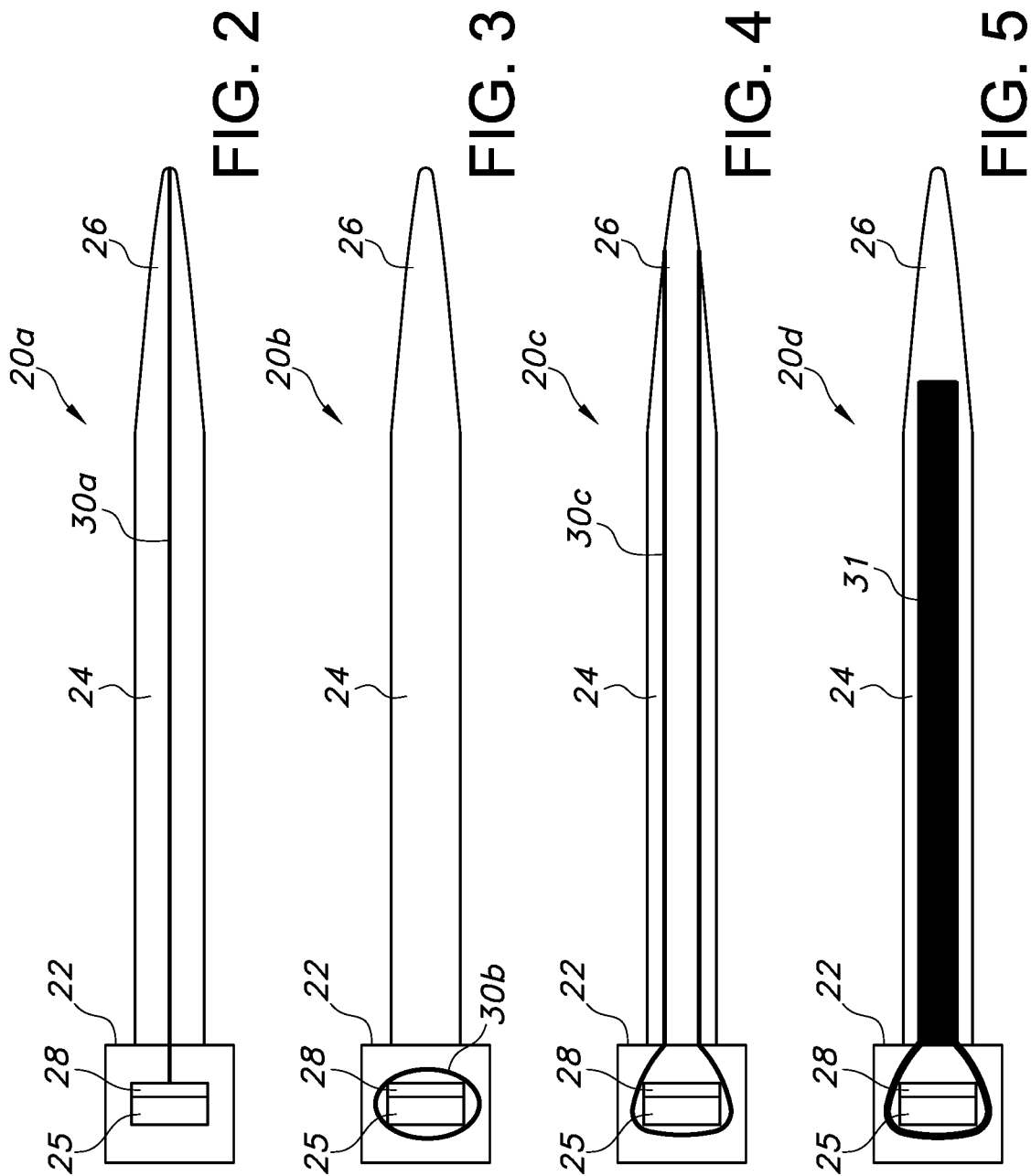

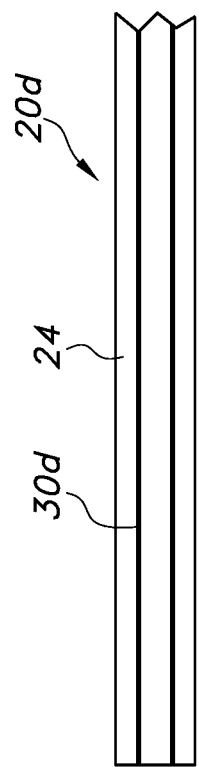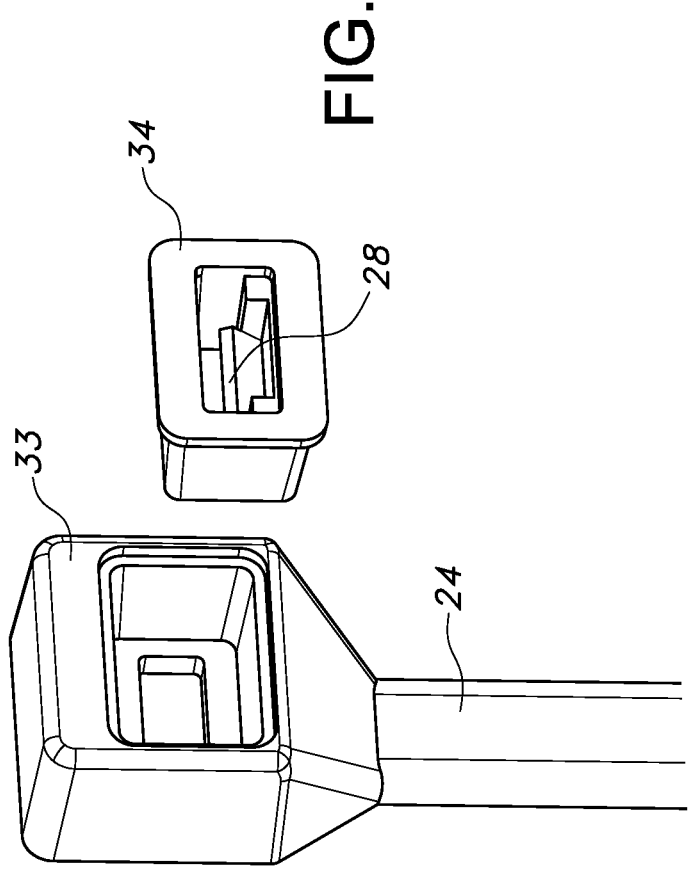

HIGH STRENGTH CABLE TIE

CROSS-REFERENCE TO RELATED APPLICATIONS

This application claims priority from U.S. provisional application Ser. No. 62/149,213, filed on Apr. 17, 2015, the specification of which is incorporated herein in its entirety for all purposes.

TECHNICAL FIELD

The present invention relates to cable ties having improved mechanical strength. More particularly, the present invention is directed to cable ties employing a continuous fiber molded therein.

BACKGROUND

A cable tie or tie-wrap, also known as a hose tie, zap-strap or zip tie, is a type of fastener for holding items together, such as electric cables or wires. Because of their low cost and ease of use, tie-wraps are ubiquitous, finding use in a wide range of other applications. Stainless steel versions, either naked or coated with a rugged plastic, cater for exterior applications and hazardous environments.

The common tie-wrap, normally made of nylon, has a tape section with teeth that engages with a pawl in the head to form a ratchet so that, as the free end of the tape section is pulled, the tie-wrap tightens and does not come undone. Another version of the tie-wrap allows a tab to be depressed to either adjust the tension or remove the tie-wrap. Another popular design of the cable tie locking mechanism involves a metallic barb in the head slot. The metallic, e.g. stainless steel, barb is inserted after the plastic part is molded. The barb engages and cuts into the strap surface to lock the strap in place when fastened.

Another prior-art design of a tie-wrap is assembled from a plastic strap component and a double lock head component. The plastic strap is extruded continuously. The double lock head has two slots with a metal barb in each slot to lock the plastic strap inserted into the head. The plastic material in this design is typically acetal.

A typical requirement for cable ties, in addition to, for example, chemical resistance to common automotive fluids, is that a fastened cable tie should withstand prolonged exposure to elevated temperatures, (e.g. at 125° C.), if it is to be applied, for example, in or in the vicinity of the engine compartment. At the same time, such a cable tie should show good mechanical strength at low, (e.g. sub-zero), temperatures. For such high-end applications, cable ties are often molded from a polyamide composition, (e.g. a plasticized polyamide 11 composition, an elastomer-modified polyamide 66 composition, etc.). Acetal material is also used to extrude cable tie straps and injection mold cable tie heads separately due to its relatively inferior processability.

A drawback of conventional nylon cable ties is that they do not fulfill all these requirements simultaneously and, especially, do not show enough strength and impact resistance at temperatures down to −35° C. This means that various cable ties of different designs and/or made from different thermoplastic compositions need to be used for assembling an electrical harness and mounting it in an automobile, for example. This concurrent use of different types of cable ties is disadvantageous from logistical, manufacturing, and economical points of view.

A cable tie has two typical failure mechanisms. First, the cable tie strap can break when the fastening load is beyond the material strength limit. Another failure mechanism involves the unlocking of the strap from the cable tie head slot, whether the cable tie uses a plastic pawl or a metallic barb. Both failure mechanisms can cause a cable tie to fail before reaching its designated loop tensile strength rating.

After installation, for example, around a bundle of wires, a plastic cable tie will experience relaxation over time. The root cause of such failure is mechanical creep. Another cause of such failure is the reduction of mechanical properties after moisture uptake. Nylon 6, 6 for example, can absorb up to 2.5% of water, which results in tensile strength reduction of 30% or more from its original value. This type of property change is unfavorable and will loosen the cable tie from its harness function.

Since the original invention of the cable tie in 1958, many follow-up patents have emerged that mainly focus on improved manufacturing methods, new materials, or special applications. More recent patents directed to the problem of insufficient strength at different temperatures focus on reinforcing of the polymer matrix with graphene.

Another prior art method of reinforcement involves introducing strengthening fibers into the raw plastic material prior to molding the cable tie. However, such reinforced plastics, when bought from a material supplier, tend to have a higher price than unreinforced plastics due to the additional step of compounding required during their manufacture. Such materials will furthermore increase the overall stiffness of the cable tie, rendering it incapable of being easily bent to form a loop.

Accordingly, it would be desirable to provide a simple, inexpensive method for reinforcing the strength of a cable tie.

SUMMARY

In one aspect of the present invention, a reinforced cable tie is provided, wherein the cable tie has a reinforcement with a continuous fiber roving throughout the whole body. In another aspect of the invention, a manufacturing method for providing reinforcement of a standard cable tie is provided. This type of reinforcement allows for a whole family of polymer matrices to be used.

The reinforced cable tie generally includes an elongate strap, a head attached to a first end of the strap and a continuous fiber reinforcement disposed in and extending substantially continuously along a path defining at least one of the strap and the head. The head has an aperture formed therein and a locking device disposed in the aperture of the head. The locking device is configured to permit a second end of the strap opposite the head to be inserted through the head aperture in a first direction and is further configured to prevent movement of the second end of the strap from the head aperture in a second direction opposite the first direction.

In a preferred embodiment, the continuous fiber is molded within one or both of the strap and the head, and is disposed continuously along a specific load path therein. Also, the continuous fiber is preferably made from a glass, aramid, metal or carbon material, or any combination thereof.

In a method according to the present invention, a cable tie is formed by placing a continuous fiber in a mold cavity of a mold, wherein the mold cavity has a size and shape of a cable tie. A plastic material is then injected into the mold cavity to form the cable tie with a continuous fiber molded therein, wherein the continuous fiber is disposed in and extends continuously along a path defining at least one of the strap and the head of the cable tie.

In a preferred embodiment, the mold cavity includes some form of structure for locating the continuous fiber within the mold cavity. This structure can be in the form of a groove, a recess or protrusion for retaining the fiber.

The present invention provides substantial business benefits. For example, the method of the present invention achieves the reinforcement during the manufacture of the cable tie and thus eliminates one step during material production.

Also the invention bears great flexibility in the sense that it works with many different polymer matrices and types of fibers and therefore can be applied in many different market segments.

Features of the disclosure will become apparent from the following detailed description considered in conjunction with the accompanying drawings. It is to be understood, however, that the drawings are designed as an illustration only and not as a definition of the limits of this disclosure.

BRIEF DESCRIPTION OF THE DRAWINGS

FIG. 2 is a schematic view of a first embodiment of the cable tie according to the present invention.

FIG. 3 is a schematic view of a second embodiment of the cable tie according to the present invention.

FIG. 4 is a schematic view of a third embodiment of the cable tie according to the present invention.

FIG. 5 is a schematic view of a fourth embodiment of the cable tie according to the present invention.

FIG. 6 is a schematic view of a fifth embodiment of the cable tie according to the present invention.

FIG. 7 is a schematic view of a sixth embodiment of the cable tie according to the present invention.

DETAILED DESCRIPTION OF PREFERRED EMBODIMENTS

Figure 1:
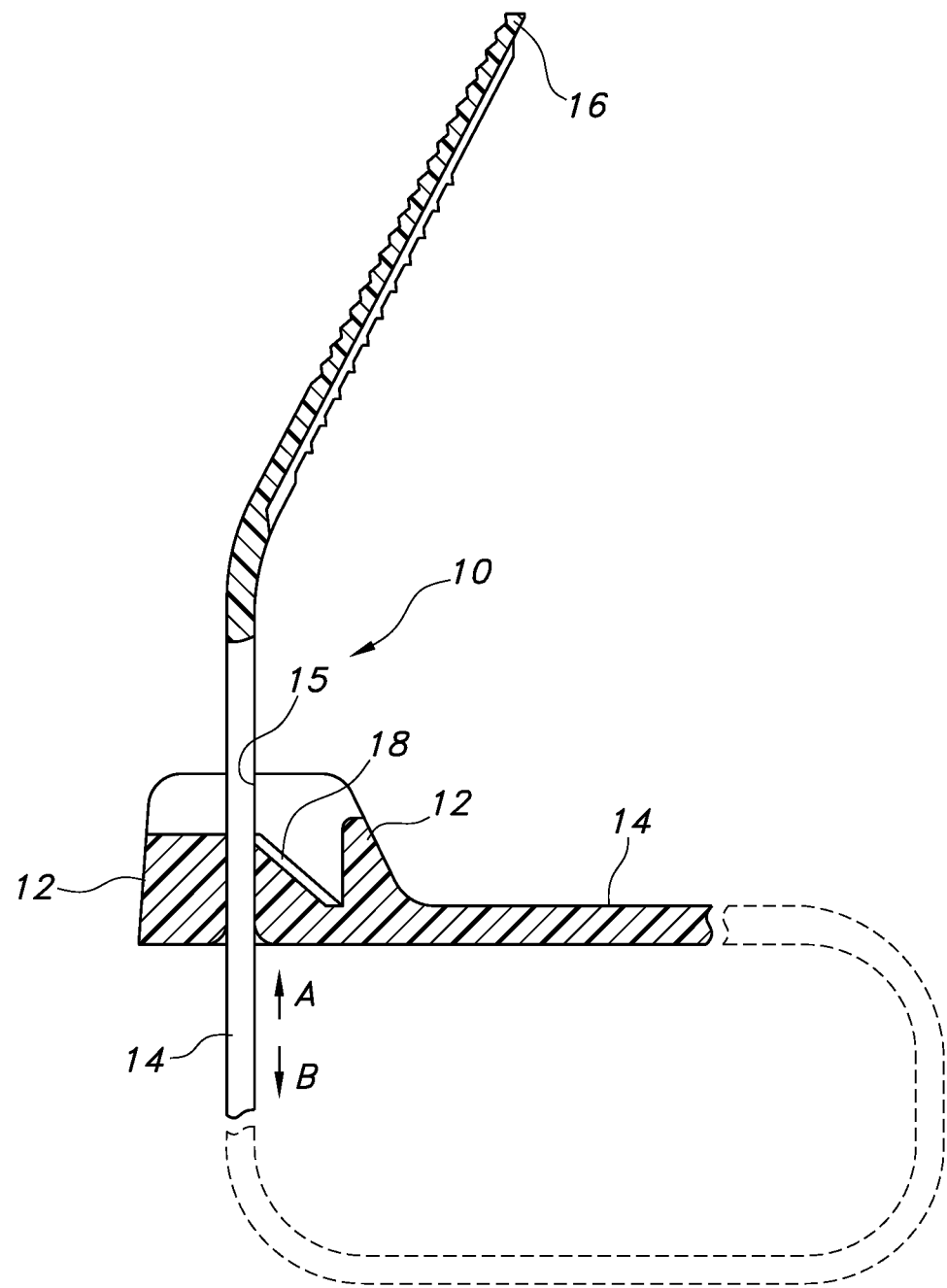
FIG. 1 shows, in section, an exemplary cable tie of the prior art, having a head containing an aperture and locking mechanism and an extending strap, with the strap inserted into the head.

Referring first to FIG. 1, a cable tie 10 of the prior art is shown for reference. The cable tie 10 of the prior art is typically an elongate molded plastic member, which is used in a manner described above to wrap around a bundle of articles (not shown). The cable tie 10 is typically made from a plastic composition and includes a head 12 at one end thereof, a tail 16 at the other end of the head and a generally planar strap 14 therebetween. In the illustrative embodiment provided, the head 12 is formed as an integral portion of the cable tie 10. However, in certain applications the cable tie 10 may be constructed in a manner where the head 12 is formed separately from the strap 16.

The head 12 of the cable tie 10 includes an aperture 15 therethrough (shown with the strap 14 therein) for insertably accommodating the tail 16 and passage of the strap 14 therein in a first direction "A". The head 12 of cable tie 10 typically includes a locking device 18 supported by the head 12 and extending into the aperture. The locking device 18 permits insertion of the strap 14 in the first direction "A" and prevents substantial movement of the strap 14 in a second direction "B" opposite the first direction upon an attempt to withdraw the strap 14 from the aperture. The locking device may include a metallic barb such as shown in U.S. Pat. No. 5,513,421, or an integrally formed plastic pawl such as shown in U.S. Pat. No. 7,017,237.

As mentioned above, it is known in the art to strengthen the plastic by introducing short and/or long reinforcing fibers to the plastic composition prior to molding the cable tie. Starting with short or long fiber reinforced compounds, all volume of an injection molded component would be equally reinforced with fibers when this process is utilized. However, this method drastically increases the costs of the raw plastic material and will stiffen the material such that forming a loop requires an unacceptable amount of applied pressure. Such materials furthermore provide an increase in strength of a factor of 2-3×, whereas substantially higher strength is desired.

Turning now to FIGS. 2-5, the present invention provides a method in which a tailored or local placement of a reinforcement structure is utilized. Specifically, a continuous fiber is disposed along the application specific load path to reinforce the cable tie only in the areas where additional strength is needed.

The cable tie 20a, 20b, 20c, 20d of the present invention is similar in several respects to the prior art cable tie 10 described above. Accordingly, the cable tie 20a, 20b, 20c, 20d includes a head 22 at one end thereof, a tail 26 at the other end of the head and a generally planar strap 24 therebetween. The head 22 of the cable tie 20a, 20b, 20c, 20d includes an aperture 25 having a locking device 28 that permits insertion of the strap 24 in one direction, but prevents removal of the strap in the opposite direction.

However, the cable tie 20a, 20b, 20c, 20d of the present invention is molded with a continuous fiber 30a, 30b, 30c, or a continuous fiber tape 31 disposed in a specific location within the cable tie. In one embodiment, a continuous fiber 30a is disposed on the centerline of the strap 24, and extends along the length of the strap, as shown in FIG. 2. In another embodiment, a continuous fiber 30b is disposed in the head 22, and extends in a circular direction around the aperture 25 of the head, as shown in FIG. 3.

In still another embodiment, a continuous fiber 30c is disposed both along the length of the strap 24 and in the head 22. Thus, a continuous fiber 30c begins at the distal tip of the strap 24 and extends along the length of the strap towards the head 22. The same continuous fiber 30c then loops in a circular direction around the aperture 25 of the head, and extends again along the length of the strap back toward the distal end of the strap, as shown in FIG. 4.

In yet another embodiment, a continuous tape 31 is disposed along the length of the strap 24 and in the head 22. In this embodiment, a glass fiber blank having a shape corresponding generally to the shape of the strap may be stamped from a sheet. The tape 31 has an elongate portion residing in the strap 24 and a loop portion extending in a circular direction around the aperture 25 of the head, as shown in FIG. 5. The tape 31 can then be placed in an injection mold and plastic can be molded over the tape to form the cable tie 20d.

In still another embodiment, a continuous fiber strand or strands is disposed along the length of a strap with the head unattached, as shown in FIG. 6. In each case, the continuous fiber reinforcement structure is disposed along a desired application specific load path to reinforce the cable tie only in the areas where additional strength is needed.

Turning now to FIG. 7, a cable tie comprising a reinforced strap will necessarily require a stronger head and locking mechanism. The cable tie of the present invention therefore may include a socket 33 and a separate face plate 34 containing a locking mechanism 28. The separate face plate 34 may be made of the same material as the strap (i.e., a continuous fiber reinforced material) for improved performance, or of a different material (e.g., a metal or a conventional fiber-reinforced plastic). An example of such a cable tie with a two-piece head is shown and described in commonly owned U.S. Patent Application Publication No. 2013/0298353, the specification of which is incorporated herein by reference.

The term "continuous fiber" is used herein to refer to a reinforcing strand, or roving, or filament structure that is contiguous and unbroken along its length extending along a desired path. Unlike fiber reinforcing methods of the past, the continuous fiber is placed in the cable tie only where needed. Suitable materials for the continuous fiber include glass, aramid, carbon, metal, basalt, polybenzimidazole, natural fibers, etc.

For the polymer matrix, different thermoplastic materials could be used, (e.g., PA, POM, PBT, ETFE, PP, etc.). Thus, suitable base plastics include, but are not limited to, polyamide (e.g., nylon), polypropylene, polycarbonate, poly(ethylene tetrafluoroethylene), polyetheretherketone, poly(ethylene and chlorotrifluoroethylene), polyvinyl chloride, polyimide, polysulfone, and combinations of two or more thereof. Suitable base plastic materials may also include thermosets. In one embodiment, the base plastic is polypropylene. In one embodiment, the base plastic is polyamide. In one embodiment, the base plastic is polyamide 6 (i.e., nylon 6). In one embodiment, the base plastic is polyamide 6,6 (i.e., nylon 6,6). In one embodiment, base plastic is polyamide 6,6 loaded at between about 90-100 phr. In one embodiment, polyamide 6,6 is loaded at about 100 phr. In one embodiment, polyamide 6,6 loaded at about 100 phr is a medium impact modified compound with embedded process aid. In one embodiment, polyamide 6,6 loaded at about 100 phr is an unfilled resin with embedded process aid.

Figure 8:
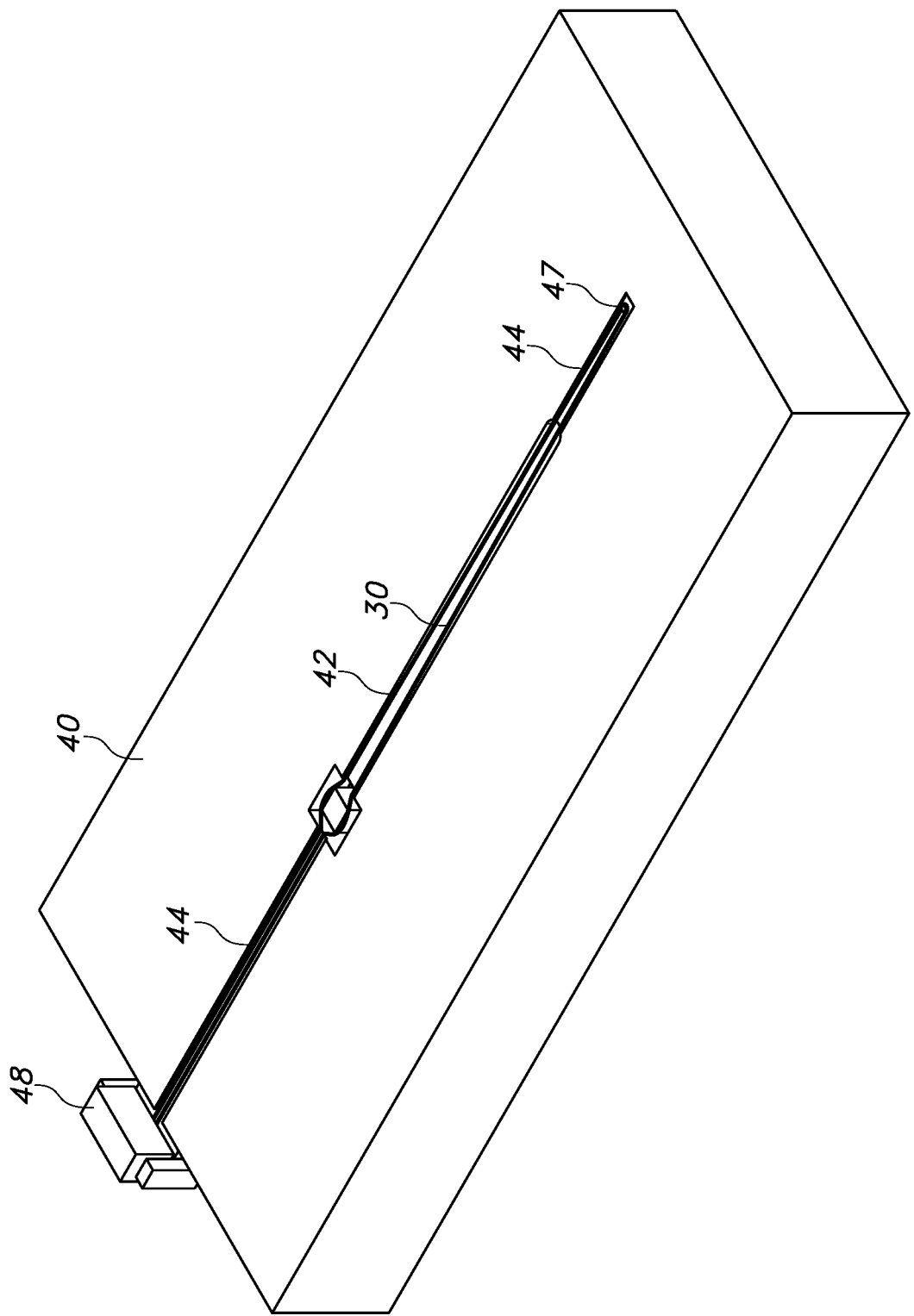
FIG. 8 is a perspective view of a mold half illustrating the method for forming a cable tie according to the present invention.

FIG. 8 shows the method for forming a reinforced cable tie according to the present invention. An injection mold 40 having a specially designed mold cavity 42 is utilized to mold the cable tie. The mold cavity 42 has an overall shape matching the cable tie, but also has provisions for accurately locating the continuous fiber 30 prior to injection of the raw plastic material. Such provisions may include a groove 44 for feeding the continuous fiber into the mold cavity and holding it at midplane. Alternatively, or in addition, such provisions may include one or more pins 47 formed in the mold for aiding the placement of the fiber strand and one or more clamps 48 for securing the fiber during molding.

Prior to the injection of the molten plastic material or liquid resin into the mold cavity 42, the fiber roving 30 will be placed and fixated in the injection mold 40 using one or more of the fixing provisions 44, 47, 48 formed in the mold cavity to keep an optimal load-dependent orientation of the reinforcing fibers during injection of the melt. The molten plastic is then injected into the mold cavity with the fiber 30 held in place. Once the plastic is set, the cable tie is removed from the mold cavity with the continuous fiber 30 now fixed in the desired location.

Using the method of the present invention, the same mechanical properties can be achieved in a conditioned nylon cable tie with only around 4 weight % of continuous glass fiber reinforcement as compared with 30 weight % of short/long-fiber reinforced compound used in reinforcing methods of the prior art.

Figure 9:
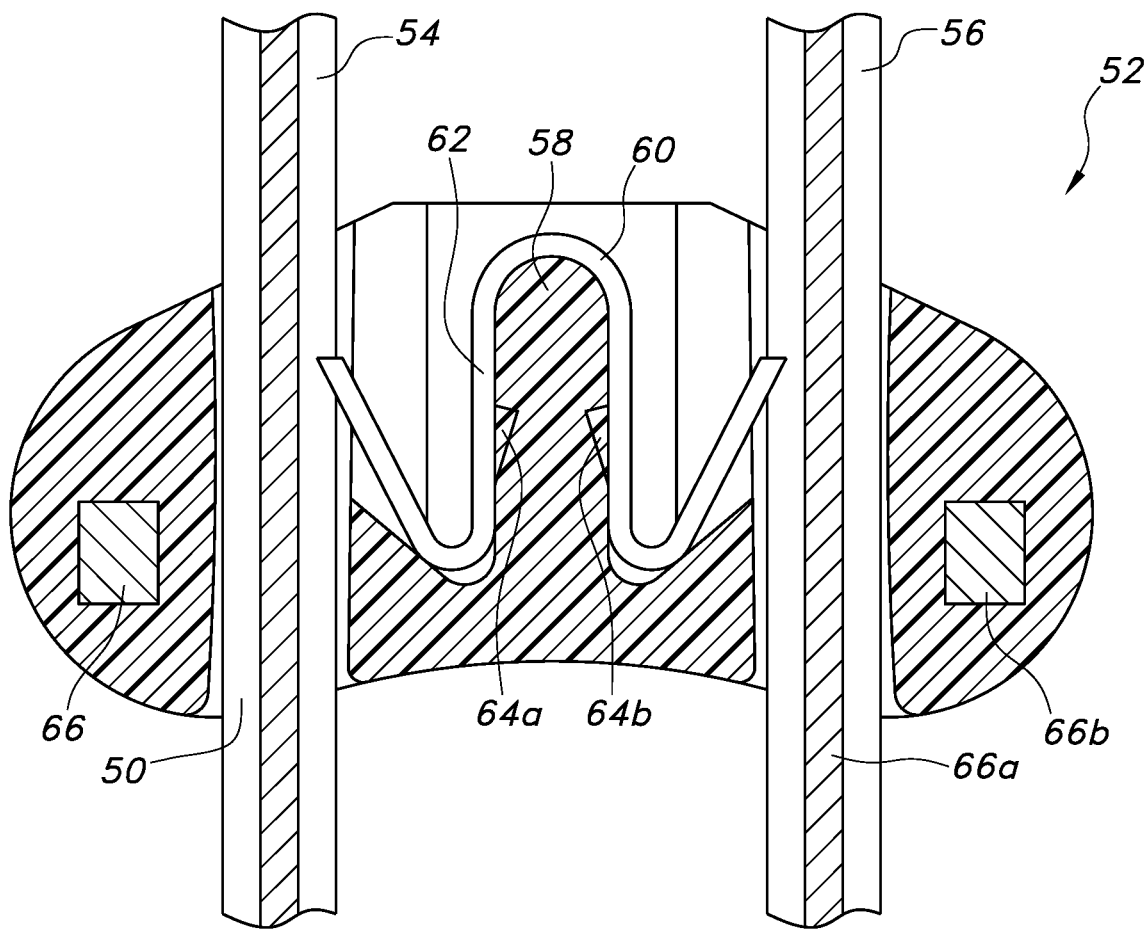
FIG. 9 is a cross-sectional view of a seventh embodiment of the cable tie according to the present invention.

The concept behind the present invention can be applied to various other cable tie designs. For example, a tailored or local placement of a continuous fiber reinforcement structure can be utilized in the cable tie design disclosed in commonly owned U.S. Pat. No. 6,128,809, which is also shown in FIG. 9.

In this design, the strap 50 of the cable tie is formed separate from the head 52, similar to that described above with respect to FIG. 6. The strap 50 is an elongate member having a first end 54, a second end 56 and a planar body. The head 52 includes an upstanding central wall 58 separating first and second parallel passageways for receipt of the first and second ends of the strap. A locking device 60 is supported by the central wall 58 and includes a body having a central joining section and a pair of parallel walls 62 extending from the joining section. The locking device is an integrally formed metallic member preferably formed of a copper alloy exhibiting sufficient rigidity yet is relatively resiliently deflectable. The locking device further includes a first barb 64a extending from one of the wall members into the first passageway and a second barb 64b extending from the other wall member into the second passageway. The barbs are provided for independent deflectable locking engagement with the first and second strap ends upon insertion into the passageways.

A continuous fiber reinforcement structure 66a, 66b, as described above, can be provided in the strap 50, and/or in the head 52. In a preferred embodiment, a first continuous fiber reinforcement structure 66a is molded within and extends along the full length of the strap 50, while a second continuous fiber reinforcement structure 66b is molded within and extends in a loop around the apertures of the head 52. It is conceivable that two continuous fiber reinforcement structures can be provided in the head, wherein each aperture of the head is surrounded by its own fiber strand.

Figure 10:
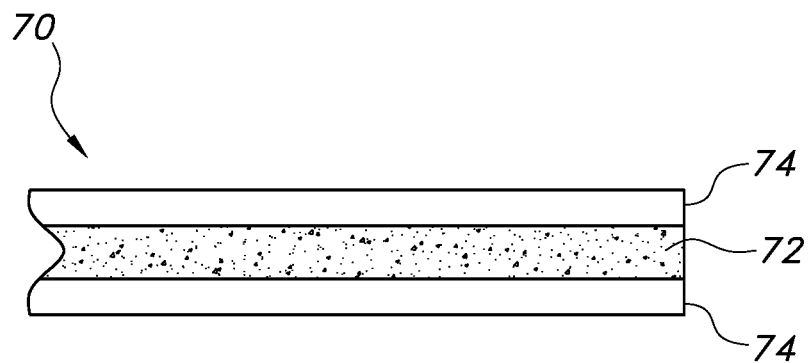
FIG. 10 is a cross-sectional view of an eighth embodiment of the cable tie according to the present invention
Figure 11:
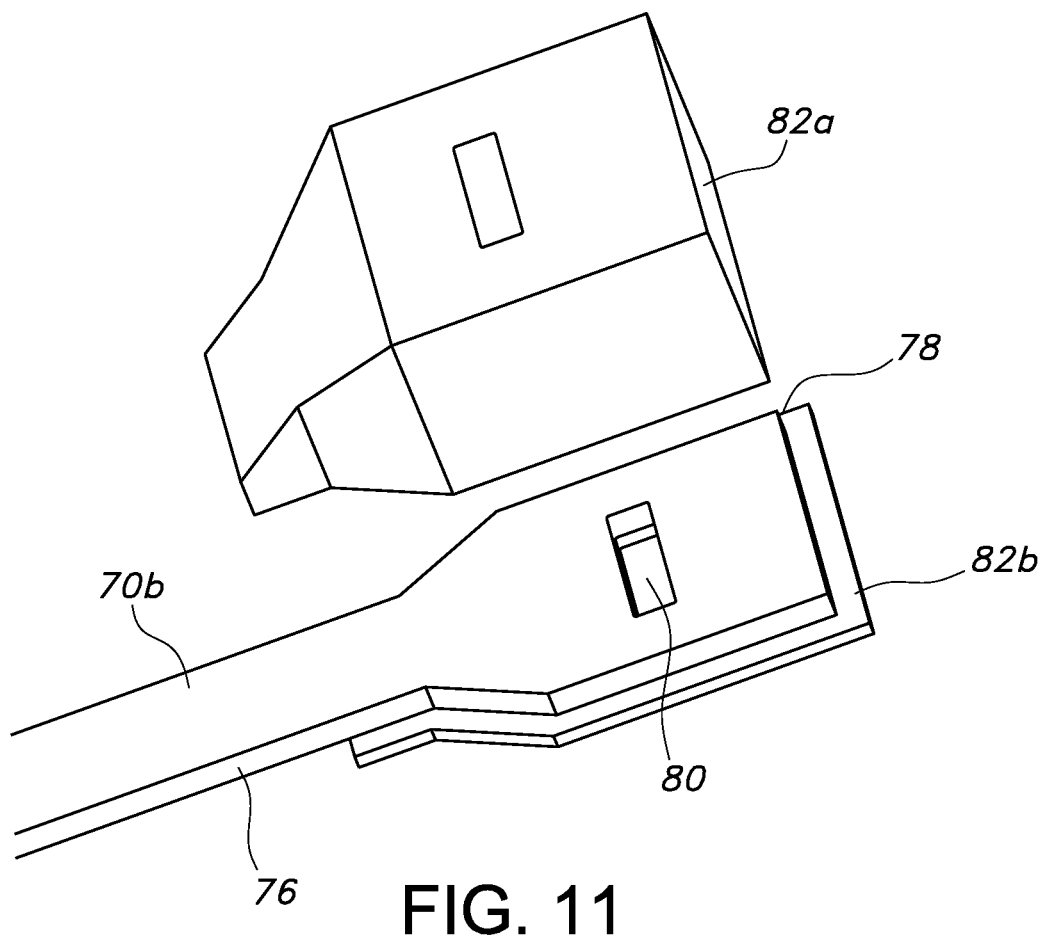
FIG. 11 is a schematic perspective view of the embodiment of the cable tie shown in FIG. 10.
Figure 12:
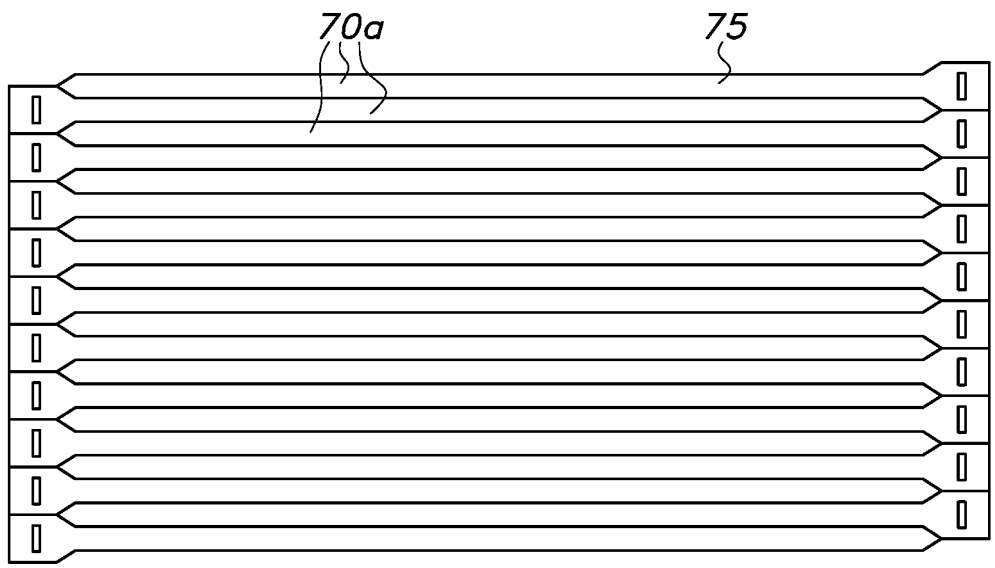
FIG. 12 is a plan view of a sheet of the continuous fiber tapes shown in FIGS. 10 and 11.

FIGS. 10-12 show another embodiment of the present invention, which is similar in some aspects to the embodiments described above with respect to FIGS. 5 and 6. In this embodiment, a cable tie laminate 70 is made by sandwiching a fiber layer 72 between two layers of plastic 74.

The layers 72, 74 forming the laminate 70 can be hot pressed together or formed in a continuous lamination machine to form a sheet 75, as shown in FIG. 12. The sheet 75 is preferably provided with pre-formed creases, which outline the periphery of a plurality of individual laminate blanks 70a. The creases facilitate the removal by stamping of individual cable tie bands 70b from the sheet. The bands 70b can also be water cut from the sheet 75 in a conventional manner.

The fiber layer 72 may be made from any of the fiber materials described above. In a preferred embodiment, the fiber layer 72 is a pressed glass fiber fabric sheet. In this case, the term "continuous fiber" refers to the fiber layer 72 of the band 70b, which has a periphery matching the periphery of the cable tie, and which is contiguous and unbroken along its length and is disposed along a desired load path of the cable tie.

The continuous laminate band 70b, which is made from the glass fiber layer 72 sandwiched between two plastic layers 74, has an elongate portion forming the strap 76 of the cable tie, and a head portion 78 in the form of a loop defining an aperture 80 for the head of the cable tie.

In this embodiment, the head of the cable tie is further built up with one or more additional pieces 82a, 82b to provide sufficient strength and structure to the cable tie. In one embodiment, a single head piece 82a, made from a plastic or other material, can be provided with sufficient structural features to enable the piece 82a to be fixed directly to the band 70b. In a preferred embodiment, two head pieces 82a, 82b are snapped together, or otherwise locked to each other, with the laminate band 70b trapped between the two pieces . . . . It is still further conceivable that one or more head pieces could be over molded to the band 70b in a subsequent injection molding process.

In cable tie embodiments with separate tie closure an extrusion process, such as co-extrusion, or pultrusion to manufacture the endless fiber reinforced tie band could be used.

As a result of the present invention, a tailored reinforced cable tie is provided having the following benefits: 1) Improved form stability at higher temperatures; 2) Lower tendency to creep; 3) Increased light-weight potential due to high weight-specific mechanical properties; 4) Wider choices of plastic materials, e.g. with lower mechanical properties/cost; 5) Improved cable tie structural integrity by reducing the chance for a plastic pawl to yield or break.

It should be apparent to those skilled in the art that the described embodiments of the present invention provided herein are illustrative only and not limiting, having been presented by way of example only. As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. While various embodiments of the present invention are specifically illustrated and/or described herein, it will be appreciated that modifications and variations of the present invention may be effected by those skilled in the art without departing from the spirit and intended scope of the invention.

All documents, patents and other literature referred to herein are incorporated by reference in their entirety.

The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims. For example, the cable tie may be embossed or printed with indicia and still be included in the meaning of "consisting essentially of", even if not specifically recited. The term "consisting of" as may be used in the following claims is intended to indicate that the claims are restricted to the recited elements.

It should be noted that it is envisioned that any feature, element or limitation that is positively identified in this document may also be specifically excluded as a feature, element or limitation of an embodiment of the present invention.

What is claimed is:

1. A cable tie comprising:
   an elongate strap;
   a head attached to a first end of said strap, said head having an aperture formed therein;
   a locking device disposed in said aperture of said head, said locking device being configured to permit a second end of said strap opposite said head to be inserted through said head aperture in a first direction and being further configured to prevent movement of said second end of said strap from said head aperture in a second direction opposite said first direction; and
   a continuous fiber reinforcement disposed in and extending substantially continuously along a path of said cable tie, said continuous fiber reinforcement comprising a first portion, a second portion, and a loop portion, said first portion extends from said second end of said strap to said loop portion, said loop portion being positioned around said head aperture, and said second portion extends from said loop portion to said second end of said strap, and wherein the said second portion is offset from said first portion of said continuous fiber reinforcement.

2. A cable tie as defined in claim 1, wherein said continuous fiber reinforcement is molded within at least one of said strap and said head.

3. A cable tie as defined in claim 1, wherein said continuous fiber reinforcement is disposed continuously along a specific load path of at least one of said strap and said head.

4. A cable tie as defined in claim 1, wherein said continuous fiber reinforcement comprises glass, aramid, carbon, metal, basalt, polybenzimidazole, natural fibers, or any combination thereof.

5. A cable tie as defined in claim 1, wherein said head comprises a socket and a face plate secured to said socket, said socket and said face plate together defining said head aperture, and said face plate including said locking device.

6. A cable tie as defined in claim 5, wherein said face plate comprises plastic, metal, fiber reinforced plastic, or any combination thereof.

7. A cable tie as defined in claim 1, wherein said locking device comprises at least one of: a single or plurality of metallic barbs; a single or plurality of plastic or reinforced plastic pawls; sets of intersecting teeth; a buckle; a ball-type lock; or a roller lock.

8. A cable tie as defined in claim 1, wherein said head is attachable to said strap during installation of the cable tie.

9. A cable tie as defined in claim 1, wherein said elongate strap comprises a laminate structure, said continuous fiber reinforcement defining a layer sandwiched between two plastic material layers to form said laminate structure.

10. The cable tie of claim 1, wherein said first portion is substantially parallel to said second portion of said continuous fiber reinforcement.

* * * * *